July 22, 1941.                H. C. OBER                2,250,391
                        GROUND TILLING IMPLEMENT
                         Filed March 14, 1939

INVENTOR.
HOWARD C. OBER
BY
        *John H. Leonard*,
                his ATTORNEY.

Patented July 22, 1941

2,250,391

UNITED STATES PATENT OFFICE 2,250,391

GROUND TILLING IMPLEMENT

Howard C. Ober, East Cleveland, Ohio

Application March 14, 1939, Serial No. 261,718

2 Claims. (Cl. 97—40)

This invention relates to garden cultivators and the like, and particularly to a garden cultivator having a prime mover which operates the cultivating tool and also drives the cultivator along the surface of the ground.

Hand controlled, power driven, garden cultivators have been provided heretofore and are available in the market. In general, these cultivators include a platform or frame supported on wheels which are arranged at the front and rear of the platform or frame, respectively, the platform or frame, in turn, supporting a power unit or engine. The cultivating tool either is suspended from the frame so that it can be lifted and lowered independently of the frame, or is rigidly affixed to the frame, and the frame is arranged to be lifted and lowered bodily with respect to the wheels. Such arrangements require one clutching mechanism for drivingly connecting and disconnecting the power unit and the tool, and another additional clutching mechanism from drivingly connecting and disconnecting the power unit and the wheels. The clutch mechanisms, in turn, generally are operated by respective hand levers, and an additional hand or foot operated lever mechanism is provided for raising or lowering the tool with respect to the frame and the wheels.

These prior structures have several disadvantages. One disadvantage is that the front wheels prevent movement of the cultivator forwardly towards the plant to a position which permits the tool to cultivate close to the plant. This is particularly true when the prior cultivators are used to cultivate plants which are arranged closely together in a row. Again, the tool is supported between the outer limits of the wheels and usually engages the ground not only rearwardly from the forward wheels, but also between the outer limits of the wheels, so that when the cultivator is moved along a row of plants, the tool cannot be disposed close to the bow of the plants. Furthermore, in the prior structures, it is inconvenient to change the setting of the tool relative to the ground, yet in cultivation of garden plants, it is necessary to raise and lower the tool quickly and frequently during the continuous operation and movement of the cultivator along the row of plants.

One of the principal objects of the present invention is to provide a cultivator which is driven along the ground surface by a self-contained power plant, and in which the tool is driven by the same power plant while, at the same time, the tool is arranged so that its depth of cultivation may be changed instantly, and may be moved and caused to operate as closely as desired to the plants to be cultivated, both when the cultivator is moved forwardly toward the plant and when it is moved alongside a row of plants.

A more specific object is to provide a cultivator which is propelled along the ground by co-operation of the power driven cutting or tilling tool itself.

Another object is to provide a small and efficient cultivator having the advantages above set forth while eliminating the necessity for the usual clutching mechanisms and tool hoisting lever mechanisms heretofore employed.

A more specific object is to provide a hand controlled cultivator, having a self-contained power plant, in which the power plant and tool are supported on a single set of wheels in a manner such that the center of gravity of the mass is positioned closely to the axis of the wheels, and the tool is substantially coextensive laterally with the outer limits of the wheels and cultivator as a whole and is positioned so as to project forwardly from the remainder of the cultivator.

Other objects and advantages will become apparent from the following specification wherein reference is made to the drawing, in which:

Fig. 4 is a detail sectional and elevational view of one of the tool teeth as indicated at 4—4 in Fig. 1.

Figure 1:
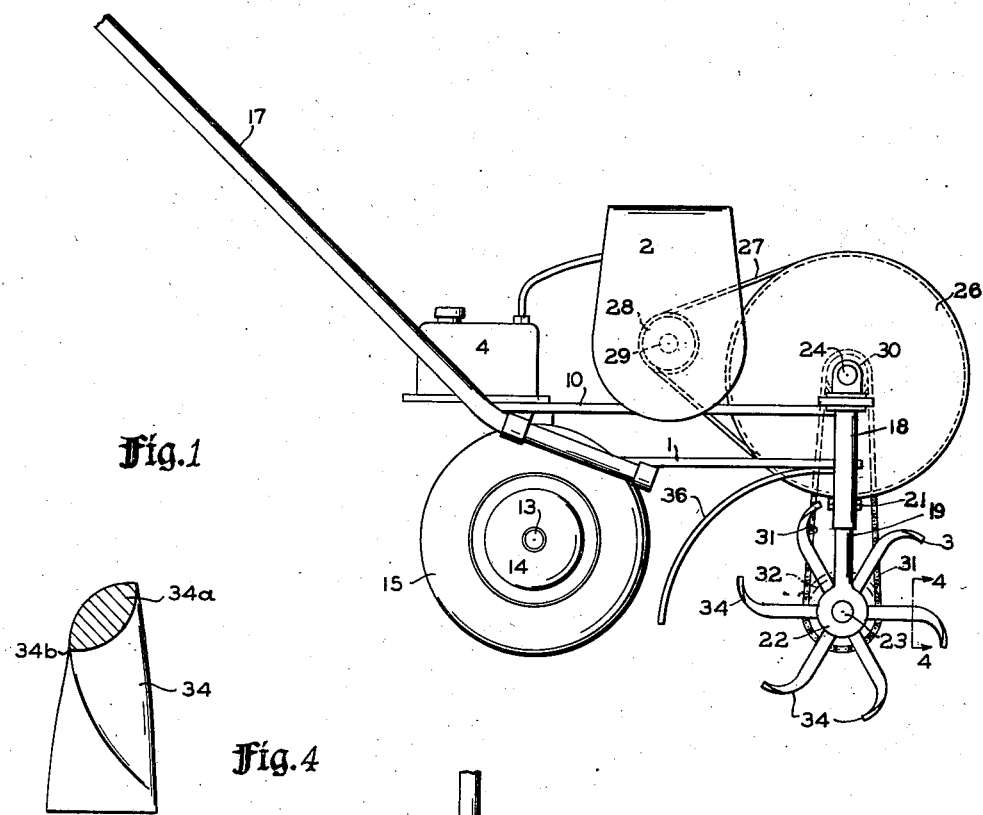
Fig. 1 is a side elevation of a power driven hand cultivator embodying the principles of the present invention.

For the purposes of illustration, the present invention is described hereinafter as embodied in a cultivator having a rotatable hoe tool and having a gasoline engine as a prime mover or power unit, its embodiment with other cultivators being readily apparent from the illustrative example.

Referring to the drawing, the cultivator comprises a carriage or frame, designated generally at 1, on which is mounted a gasoline engine 2 or other suitable prime mover, and on which frame is suspended a tool such as rotatable hoe 3, fuel being supplied to the engine from a gasoline tank 4.

In the preferred embodiment of the invention, the carriage comprises an upper platform or frame 10, including a reinforcing brace 11, which is fixedly secured on suitable depending axle supporting brackets 12. At their lower ends, the brackets 12 are connected to a transverse wheel axle 13 on which is mounted a pair of wheels 14, the wheels preferably having pneumatic tires 15 so as to afford a substantial bearing surface.

The platform 10 is provided with slots extending forwardly and rearwardly of the platform so as to receive bolts 16 by which the engine 2 may be connected to the platform and adjusted forwardly and rearwardly to the extent required.

Rigidly connected to the frame 10 are handle bars 17 which extend rearwardly and upwardly to a convenient height for grasping in the hands of an operator.

At the front of the platform are depending rigid supports 18 in which hangers 19 are telescopingly mounted so that the hangers 19 may be adjusted in vertically. In the form illustrated, the supports 18 are preferably tubular as also are the hangers 19. Each of the hangers 19 is provided with a vertically extending row of perforations 20 adapted for registry with the perforations in the associated support 18, a suitable bolt 21, which is threaded, being passed through the registered openings when the hangers are adjusted to the height desired. By removing the bolt 21 the hangers 19 may be moved downwardly out of the supports 18.

At their lower ends the hangers 19 are provided with bearings 22 in which a shaft 23 is rotatably mounted. A rotatable transverse shaft 24 is mounted on the frame, preferably directly above the shaft 23. The shaft 24 carries a pulley 26 which, through the medium of a belt 27 and a pulley 28 which is fixed on the motor crank shaft 29, is continuously driven by the engine 2.

Mounted on the shaft 24 for rotation with the pulley 26 is a sprocket 30 which, through the medium of a chain 31, is drivingly connected to a sprocket 32 which is mounted on the shaft 23 for rotation with the shaft 23.

The tool 3 is preferably in the form of three separate sections 33, each of which has a series of hoe or tiller teeth 34 arranged spirally or helically thereon. The teeth of each end section define substantially a complete spiral convolution, one a right hand spiral or helix and the other left hand spiral or helix, so as to balance end thrust. The teeth on opposite ends of the central section can be arranged in right and left hand spiral relationship as shown.

Figure 2:
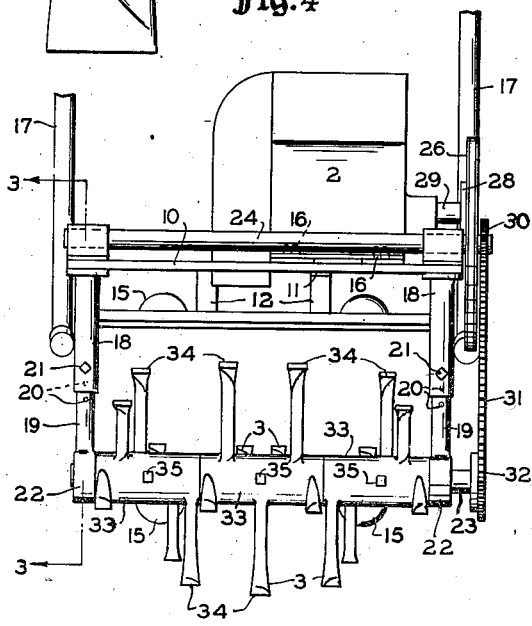
Fig. 2 is a front elevation of the apparatus illustrated in Fig. 1.
Figure 3:
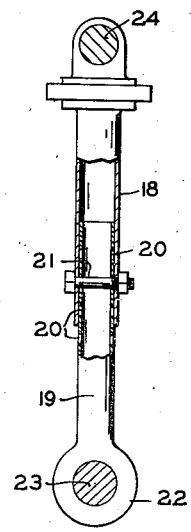
Fig. 3 is a vertical sectional view taken on a plane indicated by the line 3—3 in Fig. 2.

The teeth 34 of the tool 3 are preferably curved at their outer ends as illustrated so that as they engage the ground they tend to pull the cultivator forwardly and dig themselves into the ground to a greater degree. The shank portions of each tooth 34, for nearly its full length, preferably has a lenticular cross section as indicated at 34a in Fig. 4 and so positioned as to present a cutting edge at 34b disposed at an angle to the direction of impingement of the tooth with the soil engaged thereby. This angular relationship of cutting edge with reference to the soil increases the efficiency of the teeth in pulverizing the soil. End thrust on the mountings for the tools can be further balanced by having the angles of inclination of the major axes of the lenticular sections of approximately half of the teeth directed oppositely with respect to the other half, as illustrated on Fig. 2.

Each of the sections 33 is arranged to be received endwise on and fit snugly on the shaft 23, and each can be connected to the shaft for rotation therewith by means of a set screw 35. One or more of the sections may be used, and they may be positioned where desired along the shaft 23. Generally, however, at least two are used concurrently, their spiral effects being opposite so as not to create an unbalanced side thrust. By using two sections spaced apart, a row of plants can be spanned, and cultivated at both sides concurrently.

In the preferred form, the center of mass of the cultivator is disposed close to the axis of the wheels 15, there being an overbalance forwardly, however, due principally to the weight of the tool 3 itself and the driving and supporting connections thereof. The motor can be directly over the wheels or back of them to reduce the tendency for the implement to rotate forwardly about the wheels.

Since the handle bars 16 are of considerable length, the depth to which the tool enters into the ground can readily be controlled merely by bearing down upon or lifting the handle bars. Likewise, by holding back on the handle bars, the forward motion of the cultivator can be controlled or arrested, and the tool caused to cultivate more thoroughly at any given locality. By concurrently lifting and holding back on the handle bars, the tool can be caused to dig into the ground to a depth much greater than the length of the teeth themselves. Since the center of gravity of the cultivator is closely above the axis of the wheels 14, the cultivator can be maintained in the normal horizontal position wherein it will cultivate to the normal depth without appreciable effort.

The operating tool 3 being in advance of any other part of the cultivator, and no front supporting wheels and the like being provided, the cultivator can be moved forwardly as closely to a plant as desired and proper cultivation effected without danger to the plant.

Likewise, at one side of the cultivator, the only supporting equipment is the single bearing for one end of the shaft 23 and thus the cultivator can be moved alongside and very close to a row of plants to be cultivated, and cultivation effected very close to the plants.

The complete rotary tool 3 is preferably as wide as or wider than the space between the outer limits of the wheels 14. By tilting the platform forwardly, the weight of the cultivator can be thrown onto the tool 3 so as to assist in digging deeply in the ground when it is desired. The engagement of the tool 3 with the ground during cultivation causes the forward movement of the cultivator at a rate which would be three or four times normal walking speed if the forward motion were unopposed by the operator, but since the operator normally holds back on the handle bars 17 and reduces forward travel to normal walking speed, a combined slicing and slipping action of the tool results. This action very thoroughly breaks up the ground. As explained, if greater depth of cultivation is desired, it is only necessary to hold back on the handle bars 17 and assist in tilting the platform or frame 10 forwardly. If shallow cultivation is desired, it is only necessary to bear down on the handle bars 16 and limit the depth to which the teeth 34 may enter the ground. At any depth, however, the teeth 34 will draw the cultivator forwardly.

In the case of striking of heavy rock, roots and the like, the downward force of the teeth 34 thereagainst will cause the entire cultivator to tilt toward the operator and he will immediately be aware of the fact by the feel of the handles and thereupon he can tilt the cultivator free of such obstructions without danger of breaking the tool teeth.

The motor is kept running at all times during operation of the cultivator, and change of depth of cultivation is effected solely by movement of the handle bars 16.

The chain 31 can be adjusted for slackness by virtue of the registering openings 20 and bolt 21. If, however, it is desired to remove the shaft 23 for changing tools or for other reasons, the hangers 19 may be lifted in the supports 18 and the chain 31 removed, after which the hangers can be withdrawn downwardly from the supports.

If desired, a baffle 36 may be provided on the carriage 1 to prevent the tilled soil from being catapulted against the operator and from piling up too deeply in the operator's path.

Having thus described my invention, I claim:

1. In a ground tilting implement, a rotary tilling tool comprising a hub-like mounting having a series of generally radially extending teeth each hook-shaped at its free end, which teeth are offset from others along and about the mounting, the teeth, or part of them, having shank portions intermediate of the mounting and free ends, which shank portions are of elongated cross section and with a cutting edge directed in skewed relationship to the plane of rotation, and the teeth at one side of the lateral midportion of the tool being skewed in a direction opposite from the teeth at the other side of said midportion.

2. In a ground tilting implement, a rotary tilling tool comprising a hub-like mounting having a series of generally radially extending teeth each hook-shaped at its free end, which teeth are offset from others along and about the mounting, the teeth, or part of them, having shank portions intermediate of the mounting and free ends, which shank portions are of elongated cross section and with a cutting edge directed in skewed relationship to the plane of rotation, and the shanks of the teeth being of lenticular cross section.

HOWARD C. OBER.